United States Patent [19]

Laitar

[11] Patent Number: 4,698,377

[45] Date of Patent: Oct. 6, 1987

[54] BINDER COMPOSITIONS CONTAINING PHENOLIC RESINS AND ESTERS OF ALKOXY ACIDS

[75] Inventor: Robert A. Laitar, Woodridge, Ill.

[73] Assignee: Acme Resin Corporation, Westchester, Ill.

[21] Appl. No.: 911,866

[22] Filed: Sep. 26, 1986

[51] Int. Cl.[4] .................... C08K 5/10; C08L 61/10; C08L 75/04
[52] U.S. Cl. .................... 523/143; 524/317; 164/525; 164/526
[58] Field of Search .................... 523/143; 524/317; 164/525, 526

[56] References Cited

U.S. PATENT DOCUMENTS

| | | | |
|---|---|---|---|
| 3,432,457 | 3/1969 | Robins | 523/143 |
| 3,476,696 | 11/1969 | Quinn | 260/19 |
| 3,905,934 | 9/1975 | Gardikes | |
| 3,985,699 | 10/1976 | Schmid | |
| 4,231,914 | 11/1980 | Born et al. | |
| 4,273,179 | 6/1981 | Gardikes | |
| 4,546,124 | 10/1985 | Laitar | 523/143 |
| 4,602,069 | 7/1986 | Dunavant | 523/143 |
| 4,634,758 | 1/1987 | Laitar | 523/143 |

Primary Examiner—C. Warren Ivy

[57] ABSTRACT

Esters of alkoxy acids, particularly those of 3-alkoxy-propionic acids are used as part or all of the polar solvent in solvent systems for binder compositions containing phenolic resins and polyisocyanates.

25 Claims, No Drawings

BINDER COMPOSITIONS CONTAINING PHENOLIC RESINS AND ESTERS OF ALKOXY ACIDS

FIELD OF THE INVENTION

This invention relates to binder compositions, moldable compositions which include the binders and aggregate material, articles made from the moldable compositions, and a process for making them. More particularly, the invention relates to foundry binder compositions, moldable compositions including the same, and aggregate material in foundry cores or molds made therefrom, including a process for their manufacture.

BACKGROUND OF THE INVENTION

Binders or binder systems for foundry cores and molds are well known. In the foundry art, cores or molds for making metal castings are normally prepared from a mixture of an aggregate material, such as sand, and a binding amount of a binder or binder system. Typically, after the aggregate material and binder have been mixed, the resultant mixture is rammed, blown, or otherwise formed to the desired shape or pattern, and then cured with the use of catalyst and/or heat to a solid, cured state.

Resin binders used in the production of foundry molds and cores are often cured at high temperatures to achieve the fast-curing cycles required in foundries. However, in recent years, resin binders have been developed which cure at a low temperature, to avoid the need for high-temperature curing operations which have higher energy requirements and which often result in the production of undesirable fumes.

One group of processes which do not require heating in order to achieve curing of the resin binder are referred to as "cold-box" processes. In such processes, the binder components are coated on the aggregate material, such as sand, and the material is blown into a box of the desired shape. Curing of the binder is carried out by passing a gaseous catalyst at ambient temperatures through the molded resin-coated material. In such processes, the binder components normally comprise a polyhydroxy component and a polyisocyanate component. These cure to form a polyurethane in the presence of a gaseous amine catalyst.

Another group of binder systems which do not require gassing or heating in order to bring about curing are known as "no-bake" systems. These "no-bake" systems also frequently employ an aggregate material, such as sand coated with a polyhydroxy component and a polyisocyanate component. In this case, the coated sand is usually mixed with a liquid tertiary amine catalyst just before the sand is placed into a holding pattern or core box, and the material is allowed to cure at ambient temperatures or slightly higher.

Binder systems which employ polyhydroxy and polyisocyanate components usually contain solvents as well. These provide mixtures of lower viscosity which are more readily coated on sand. Although the solvents do not enter to any significant degree into the reaction between the polyisocyanate and the polyhydroxy compound, they can affect the reaction. As a result, cores and molds prepared using different solvents for the binders may have quite different properties.

A number of U.S. patents related to polyurethane binder systems are directed to specific solvent additives. Such patents include U.S. Pat. Nos. 3,476,696; 3,905,934; 3,985,699; 4,231,914; and 4,273,179.

Although binder systems containing these solvents have been quite useful, such systems with urethane binders still exhibit certain disadvantages. For example, there are certain applications where a refractory coating on the cores or molds is required to obtain the necessary surface finish on castings produced from the cores or molds. Water-based refractory coatings are preferred for this purpose. However, when cores and molds, prepared using urethane binders, are washed with water-based refractory coating material, they exhibit an undesired loss of tensile strength.

Now it has been found, in accordance with this invention, that the use of certain solvents, not hitherto used with urethane binder systems, overcomes this deficiency and produces cores and molds with good strength even after they have been washed with water-based core washes.

SUMMARY OF THE INVENTION

In accordance with this invention, there is provided a binder composition comprising a phenolic resin component, an isocyanate component having a functionality of two or more and sufficient catalyst to catalyze the reaction between the phenolic resin and the isocyanate. The phenolic resin includes at least one phenolic resin selected from the group consisting of phenolic resole resins and phenolic novolak resins, and sufficient solvent to reduce the viscosity of said phenolic resin component to below about 1000 centipoises. The solvent comprises a liquid ester of an alkoxyaliphatic carboxylic acid.

Further provided in accordance with this invention, is a process for making foundry cores or molds which comprises employing a polyurethane binder system having a solvent for the binder components which comprises a liquid ester of an alkoxyaliphatic carboxylic acid.

DESCRIPTION OF THE PREFERRED EMBODIMENTS

The phenolic resin component employed in the practice of this invention can vary widely. It may include any phenolic resin which is substantially free of water, that is, contains less than about 5% and preferably less than about 1% water, based on the weight of the resin, and which is soluble in the solvents employed, such as phenolic resole or phenolic novolak resins formed by reacting phenolic compounds with aldehydes. Resole or A-stage resins, as well as resitol or B-stage resins, may be made by reacting a molar excess of aldehyde, such as formaldehyde, with a phenolic material in the presence of an alkaline catalyst or metal ion catalysts; the novolak resins may be formed by reacting a molar excess of phenolic component with an aldehyde in the presence of an acid catalyst. Suitable resins are those having benzylic ether bridges between the phenolic rings. A particularly suitable resin is the alkoxy modified phenolic resole resin disclosed in U.S. Pat. No. 4,546,124, which disclosure is incorporated herein by reference in its entirety.

The polyisocyanate component which is employed in a binder according to this invention may likewise vary widely and has a functionality of two or more. Exemplary of the useful isocyanates are organic polyisocyanates such as tolylene-2,4-diisocyanate, tolylene-2,6-diisocyanate, and mixtures thereof, and particularly the crude mixtures thereof that are commercially available. Other typical polyisocyanates include methylene-bis-(4-phenyl isocyanate), n-hexyl diisocyanate, naphthalene-1,5-diisocyanate, cyclopentylene-1,3-diisocyanate, p-phenylene diisocyanate, tolylene-2,4,6-triisocyanate, and triphenylmethane-4,4',4''-triisocyanate. Higher isocyanates are provided by the liquid reaction products of (1) diisocyanates and (2) polyols or polyamines and the like. Also contemplated are the many impure or crude polyisocyanates that are commercially available. A typical commercially available isocyanate is polymethylene polyphenylisocyanate such as PAPI-135 sold by Upjohn Co. and having a Brookfield viscosity of about 177 centipoises at 25° C., and an isocyanate equivalent of 134.

Generally, the amounts of the phenolic resin component (A) and the isocyanate component (B) employed in a binder composition of the invention are not critical and can vary widely. However, there should at least be enough of the isocyanate component present to react substantially completely with the phenolic resin component so that there is no significant unreacted excess of either component present when reaction is complete. In this regard, the isocyanate component is generally employed in a range of from about 15% to about 400% by weight, based on the weight of the phenolic resin component and is preferably employed in a range of from about 20% to 200%.

Moreover, liquid isocyanates can be used in undiluted form so long as there is a sufficient amount of a liquid ester of an alkoxyaliphatic acid in the solvent employed with the phenolic resin component. Solid or viscous isocyanates can also be utilized and when employed are generally used with an organic solvent such as those described more fully hereinafter. In this respect, it is to be noted that component (B), the isocyanate component, may include up to 8% by weight of solvent.

Both components (A) and (B) are, as a practical matter, dissolved in the described solvents in order to provide components-solvents mixtures of desirable viscosity and thus facilitate the use of the same, such as in coating aggregate material with the components. Sufficient solvents are employed to provide a Brookfield viscosity of solutions of components (A) and (B) in suitable solvents which is below about 1000 centipoises and preferably less than about 500 centipoises. While the total amount of solvent can vary widely, it is generally present in a composition of this invention in a range of from about 5% to about 70% by weight, based on total weight of the phenolic component (A), and is preferably present in a range of from about 20% to about 60% by weight of phenolic component (A).

The solvents employed in the practice of this invention can vary widely so long as they contain, as previously mentioned, a liquid ester of an alkoxyaliphatic acid. Sufficient amounts of the ester are used to give cores of suitable strength after they have been washed with water based core washes. In this respect, generally from about 5% or more by weight, based on the weight of the phenolic resin, of the liquid ester of an alkoxyaliphatic acid should be present as part of the solvent mixture. Preferably from about 10% to about 45% of this liquid ester, based on the weight of the phenolic resin, should be present.

The solvents employed in the practice of this invention are generally mixtures of hydrocarbon solvents and liquid esters of alkoxyaliphatic acids. Also, other polar solvents such as other esters or ketones may be used in combination with the solvents of this invention.

Suitable exemplary hydrocarbon solvents include aromatic hydrocarbons such as benzene, toluene, xylene, ethyl benzene, high-boiling aromatic hydrocarbon mixtures, heavy aromatic naphthas and the like, all of which are particularly useful solvents.

Exemplary liquid esters of alkoxyaliphatic carboxylic acids useful in this invention include the esters having the general formula:

wherein R and $R^1$ are alkyl groups having 1 to 8 carbon atoms, $R^2$ is hydrogen or an alkyl group having from 1 to 4 carbon atoms and n is zero or a small positive integer, preferably from 1 to 4. The solvents are ones with which the phenolic resin, employed in the process of this invention, forms a homogenous solution at room temperature.

Specific suitable exemplary esters include ethyl 3-ethoxypropionate, butyl 3-ethoxypropionate and butyl 3-butoxypropionate. Ethyl 3-ethoxypropionate is a particularly useful solvent.

The foregoing esters provide good solubility for the phenolic resins. Foundry cores or molds prepared using phenolic urethane binders containing these solvents retain more of their tensile strength after washing with waterbased core washes.

When other polar solvents are employed, the ester solvents of this invention should still be present in the solvent combination in the amounts mentioned above. It is understood that the total amount of polar solvent and hydrocarbon solvent can vary within all proportions with respect to each other so long as the required amount of the mentioned ester solvents are present and the combination of solvents results in forming solutions with the phenolic resin component and isocyanate component which permit substantially uniform and complete coating of aggregate material, such as sand.

As previously indicated hereinabove, the compositions of this invention can be cured by both the "cold box" and "no-bake" processes. In this connection, the compositions include a suitable catalyst (C). While any suitable catalyst for catalyzing the reaction between the phenolic resin component and isocyanate component may be used, it is to be understood that when employing the "cold box" process the catalyst employed is generally a volatile catalyst. On the other hand, where the "no-bake" process is employed, a liquid catalyst is generally utilized. Moreover, no matter which process is utilized, that is, the "cold box" or the "no-bake" process, at least enough catalyst is employed to cause substantially complete reaction of components (A) and (B).

Preferred exemplary catalysts employed when curing the compositions of this invention by the "cold box" process are volatile tertiary amine gases which are passed through a core or mold generally along with an inert carrier, such as air or carbon dioxide. Exemplary volatile tertiary amine catalysts which result in a rapid cure at ambient temperature that may be employed in the practice of the present invention include trimethylamine, triethylamine and dimethylethylamine and the like.

On the other hand, when utilizing the compositions of this invention in the "no-bake" process, liquid tertiary amine catalysts are generally and preferably employed. Exemplary liquid tertiary amines which are basic in nature include those having a pK$_b$ value in a range of from about 4 to about 11. The pK$_b$ value is the negative logarithm of the dissociation constant of the base and is a well-known measure of the basicity of a basic material. The higher this number is, the weaker the base. Bases falling within the mentioned range are generally organic compounds containing one or more nitrogen atoms. Preferred among such materials are heterocyclic compounds containing at least one nitrogen atom in the ring structure. Specific examples of bases which have a pK$_b$ value within the range mentioned include 4-alkylpyridines wherein the alkyl group has from 1 to 4 carbon atoms, isoquinoline, arylpyridines, such as phenylpyridine, pyridine, acridine, 2-methoxypyridine, pyridazines, 3-chloropyridine, quinoline, N-methylimidazole, 4,4-dipyridine, phenylpropylpyridine, 1-methylbenzimidazole and 1,4-thiazine. Additional exemplary, suitable preferred catalysts include but are not limited to tertiary amine catalysts such as N,N-dimethylbenzylamine, triethylamine, tribenzylamine, N,N-dimethyl-1,3-propanediamine, N,N-dimethylethanolamine and triethanolamine. It is to be understood that various metal organic compounds can also be utilized alone as catalysts or in combination with the previously mentioned catalysts. Examples of useful metal organic compounds which may be employed as added catalytic materials are cobalt naphthenate, cobalt octoate, dibutyltin dilaurate, stannous octoate and lead naphthenate and the like. When used in combinations, such catalytic materials, that is the metal organic compounds, the nitrogen-containing catalysts and amine catalysts, may be employed in all proportions with each other.

It is further understood that when utilizing the compositions of this invention in the "no-bake" process, the amine catalysts, if desired, can be dissolved in suitable solvents such as, for example, the hydrocarbon solvents mentioned hereinabove. The liquid amine catalysts are generally employed in a range of from about 0.5% to about 15% by weight, based on the weight of the phenolic resin component present in a composition in accordance with the invention.

When employing a binder composition of this invention in the "no-bake" process, the curing time can be controlled by varying the amount of catalyst added. In general, as the amount of catalyst is increased, the cure time decreases. Furthermore, curing takes place at ambient temperature without the need for subjecting the compositions to heat, or gassing or the like. In this regard, however, in usual foundry practice preheating of the sand is often employed to raise the temperature of the sand to from about 30° F. up to as high as 120° F. and preferably up to about 75° F. to 100° F. in order to accelerate the reactions and control temperature and thus provide a substantially uniform operating temperature on a day-to-day basis. However, it is to be understood that such preheating is neither critical nor necessary in carrying out the practice of this invention.

While the binder compositions of this invention may be employed by admixing the same with a wide variety of particulate materials, such as limestone, calcium silicate and gravel and the like, in order to bind the same, and the admixture then manipulated in suitable fashion to form coherent shaped structures, they are particularly useful in the foundry art as binding compositions for foundry sand. When so employed, the amount of binder and sand can vary widely and is not critical. On the other hand, at least a binding amount of the binding composition should be present in order to coat substantially completely and uniformly all of the sand particles and to provide a uniform admixture of the sand and binder and, so that when the admixture is conveniently shaped as desired and cured, there is provided a strong, uniform, shaped article which is substantially uniformly cured throughout, thus minimizing breakage and warpage during handling of the shaped article, such as, for example, sand molds or cores, so made. In this regard, the binder may be present in a moldable composition, in accordance with this invention, in a range of from about 0.7% to about 6.0% by weight based on the total weight of the composition.

Other commonly employed additives can be optionally used in the binder compositions of this invention. Such additives include, for example, organo silanes which are known coupling agents. The use of such materials may enhance the adhesion of the binder to the aggregate material. Examples of useful coupling agents of this type include amino silanes, epoxy silanes, mercapto silanes, hydroxy silanes and ureido silanes such as, for example, γ-aminopropyltrimethoxysilane, γ-hydroxypropyltrimethoxysilane, 3-ureidopropyltrimethoxysilane, γ-mercaptopropyltrimethoxysilane, γ-glycidoxypropyltrimethoxysilane, β-(3,4-epoxycyclohexyl)trimethoxysilane, N-β-(aminoethyl)-γ-aminopropyltrimethoxysilane and the like.

In the practice of this invention, additives normally utilized in foundry manufacturing processes can also be added to the compositions during the sand coating procedure. Such additives include materials such as iron oxide, clay, carbohydrates, potassium fluoroborates, wood flour and the like.

In general, the process for making a moldable composition, in accordance with this invention, comprises admixing aggregate material with at least a binding amount of (A) a phenolic resin component, (B) an isocyanate component having a functionality of two or more, and a sufficient amount catalyst to substantially completely catalyze the reaction between components (A) and (B). Component (A) includes at least one phenolic resin selected from the group consisting of phenolic resole resins and phenolic novolak resins. The only limitation is that the resin is one that forms a homogeneous solution at room temperature with the solvent medium. The resin is dissolved in sufficient solvent to reduce the viscosity of the phenolic resinous component to below about 1000 centipoises. This solvent comprises a polar organic solvent containing a liquid ester of an alkoxyaliphatic acid. Hydrocarbon solvent may be added.

It is to be understood that there is no criticality in the order of mixing the constituents with the aggregate material. It is to be further understood that as a practical matter, the phenolic resin component (A) can be stored separately and mixed with solvent just prior to use or, if desirable, mixed with solvent and stored until ready to use. Such is also true with component (B), the isocyanate component. On the other hand, components (A) and (B), as a practical matter, should not be brought into contact with each other until ready to use in order to prevent any possible premature reaction which might take place and in this regard components (A) and (B) may be mixed with the aggregate material either simultaneously or one after the other in suitable mixing devices, such as mullers, continuous mixers, ribbon blenders and the like, while continuously stirring the admixture to insure uniform coating of aggregate particles.

More specifically, however, when the admixture is to be cured according to "cold box" procedures, the admixture after shaping as desired, is subjected to gassing with an amine catalyst in air and the flow rate of catalyst through the shaped admixture should be sufficient to provide sufficient catalyst to substantially complete reaction between components (A) and (B) and give a cured shaped product.

In contrast, however, when the admixture is to be cured according to "no-bake" procedures, the catalyst is added to the aggregate material simultaneously with or after coating the aggregate material with components (A) and (B), the admixture then being shaped and simply permitted to cure until reaction between components (A) and (B) is substantially complete and thus forming a shaped product such as a foundry core or mold. On the other hand, it is to be understood that the catalyst may also be admixed with either one of the components (A) or (B) prior to coating of the aggregate material with the components.

Consequently, by so proceeding, as indicated with an admixture of foundry sand and a binding amount of components (A) and (B), there is formed a foundry core or mold comprising foundry sand and a binding amount of a binder composition comprising the reaction product of components (A) and (B) and polar organic solvent containing at least sufficient liquid ester of an alkoxyaliphatic acid.

The following specific examples illustrate the present invention. They are not intended to limit the invention in any way. Unless otherwise indicated, all parts and percentages are by weight.

EXAMPLE 1

A methoxy modified phenolic resole resin, prepared by the method given in U.S. Pat. No. 4,546,124, was used as the polyhydroxy component of a foundry urethane binder. A solution of the resin was prepared by dissolving 55 g. of the resin in a mixture of 20 g. of ethyl 3-ethoxypropionate and 25 g. of aromatic hydrocarbon solvent. 0.4 g. of silane A-1160 was also added. The hydrocarbon solvent is an aromatic hydrocarbon having a flash point above 100° F. The silane is sold by the Union Carbide Corp., New York, N.Y. The isocyanate solution used for the preparation of the urethane resin was prepared by dissolving 75% polymethylene polyphenylisocyanate, in 25% of the aromatic hydrocarbon solvent.

To a K-45 Kitchen Aid mixer was added 2500 g. of silica sand. The mixer was started and 17.2 g. of the methoxy modified resole resin solution and 14.1 g. of the polymeric isocyanate were added. Then 0.7 ml of a tertiary amine catalyst solution was added. (The catalyst is a commercial catalyst, No. 5082, available from the Acme Resin Corp., Forest Park, Ill.) The sand was discharged from the mixer 1 minute after the addition of the catalyst. Part of the sand was used immediately to form 12 standard American Foundry Society 1-inch dog bone tensile briquets using a Dietert No. 696, 12-gang core box. Cores were cured at room temperature and broken after 10-minute, 1-hour, and 24-hour cure times. Tensile strengths were determined using a Detroit Testing Machine Company Model CST tester. A second portion of the sand was used to make a pyramid core. A thermometer was inserted into the core. The stripping time was determined as the time at which the core is so hard that the thermometer can no longer be pushed into the core. All samples from this and the following examples showed stripping times of 5–6 minutes. Other cores which had been removed from the core box for one hour were dipped in a water-based core wash and then dried in an oven at 165° C. for 25 minutes. Tensile strengths of the cores were determined 1 hour and 24 hours after removal from the oven.

Comparative tests were run following the same directions as used for Example 1, except that the ethyl 3-ethoxypropionate was replaced by dibasic ester, a solvent used in the prior art. Dibasic ester, available from Du Pont, Wilmington, Delaware, contains approximately 25% dimethyl succinate, 50% dimethyl glutarate, and 25% dimethyl adipate.

Results of the tests performed using the solvent of this example and of the comparative tests using the dibasic ester solvent are given in Table I. The superior strength of the cores of this example after washing with a water-based core wash is clearly shown when compared with that of the cores prepared using the solvent of the prior art.

TABLE I

| | Tensile Strength (psi) | | | | |
| | Unwashed | | | Washed | |
| Test Cores | 10 min | 1hr | 24 hrs | 1 hr | 24 hrs |
| --- | --- | --- | --- | --- | --- |
| Example 1 | 180 | 300 | 410 | 490 | 522 |
| Comparative Test | 165 | 260 | 380 | 222 | 223 |

EXAMPLE 2

This example illustrates use of the alkoxy modified phenolic resole resin in the "cold-box" process. The resin solution was prepared as in Example 1 except that the resin solution contained 60% resin, 24% aromatic solvent, 15% ester solvent and 1% of red oil as a release agent. The resole resin solution (40 g.) and 40 g. of the isocyanate solution were mixed with 5 kg of 410 sand using a K-45 Kitchen Aid mixer. The foundry mix was blown into a Redford CBT-1 core blower. Cores were blown at 50 psi air pressure and gassed 3 seconds with a 12% dimethylethylamine in $CO_2$ at 30 psi and then for 5 seconds with purge air at 30 psi. Tensile strengths were measured at 1 minute, 1 hour, and 24 hours after curing using a Detroit Testing Machine Company Model CST tensile tester. Tensile strengths were also measured of cores which had been dipped in a water-based core wash 15 minutes after the cores were removed from the core box. These cores were dried at 165° C. for 25 minutes and then held for 1 hour and 24 hours before testing.

Comparative tests were run on cores prepared using the prior art solvent like the comparative test cores used for comparison with the cores prepared in Example 1.

Results of these tests, given in Table II, again show that cores prepared using a solvent of this invention have superior tensile strengths after water washing.

TABLE II

| | Tensile Strength (psi) | | | | |
| | Unwashed | | | Washed | |
| Test Cores | 1 min | 1 hr | 24 hrs | 1 hr | 24 hrs |
| --- | --- | --- | --- | --- | --- |
| Example 2 | 222 | 318 | 310 | 148 | 137 |
| Comparative Test | 217 | 290 | 303 | 97 | 97 |

EXAMPLES 3 AND 4

The general procedure of Example 2 was followed except that the ester solvent was butyl 3-ethoxypropionate (Example 3) or butyl 3-butoxypropionate (Example 4). Test results given in Table III show that cores prepared using these solvents have tensile strengths before and after washing which are comparable to those using ethyl 3-ethoxypropionate.

TABLE III

| Test Cores | Tensile Strength (psi) | | | | |
| --- | --- | --- | --- | --- | --- |
| | Unwashed | | | Washed | |
| | 1 min | 1 hr | 24 hrs | 1 hr | 24 hrs |
| Example 3 | 205 | 275 | 275 | 137 | 123 |
| Example 4 | 208 | 275 | 322 | 125 | 120 |

EXAMPLE 5

The general procedure of Example 2 was followed except that the resin solution contained 60% resin, 19% aromatic solvent, 10% ethyl 3-ethoxypropionate, 10% di-(2-ethylhexyl) adipate and 1% red oil.

Comparative tests were run on cores prepared following the same procedures except that the ethyl 3-ethoxypropionate was replaced by dibasic ester. Results of the tests, given in Table IV, show that cores prepared using a mixture of solvents containing a solvent of this invention have superior strength after water washing.

TABLE IV

| Test Cores | Tensile Strength (psi) | | | | |
| --- | --- | --- | --- | --- | --- |
| | Unwashed | | | Washed | |
| | 1 min | 1 hr | 24 hrs | 1 hr | 24 hrs |
| Example 5 | 200 | 280 | 350 | 217 | 183 |
| Comparative Test | 188 | 287 | 332 | 187 | 155 |

EXAMPLE 6

The general procedure of Example 2 was followed except that the resin solution contained 60% resin, 19% aromatic solvent, 15% ethyl 3-ethoxypropionate, 1% red oil and 5% TX1B. (TX1B is the diisobutyrate of the diol TEXANOL. It is available from Eastman Chemicals, Kingsport, Tenn.) Cores prepared using this resin solution had tensile strengths before and after water washing comparable with those of Examples 2–4. This shows that other polar solvents can be used in combination with the alkoxy acid esters of this invention.

Thus, it is apparent that there has been provided, in accordance with the invention, a foundry binder composition that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to include all such alternatives, modifications, and variations as set forth within the spirit and broad scope of the appended claims.

What is claimed is:

1. A binder composition comprising (A) a phenolic resin component including at least one phenolic resin selected from the group consisting of phenolic resole resins and phenolic novolak resins, sufficient solvent to reduce the viscosity of said phenolic resin component to below about 1000 centipoises, said solvent comprising a liquid ester of an alkoxyaliphatic carboxylic acid, (B) an isocyanate component having a functionality of two or more and (C) sufficient catalyst to catalyze the reaction between components (A) and (B).

2. A binder composition according to claim 1 wherein the liquid ester of an alkoxyaliphatic acid has the general formula:

$$RO(CH_2)_n CHR^2 CO_2 R^1$$

wherein R and $R^1$ are alkyl groups having 1 to 8 carbon atoms, $R^2$ is hydrogen or an alkyl group having from 1 to 4 carbon atoms, n is zero or a small positive integer, and the phenolic resin forms a homogenous solution at room temperature with the solvent.

3. A binder composition according to claim 2 wherein the ester of an alkoxyaliphatic acid is ethyl 3-ethoxypropionate.

4. A binder composition according to claim 2 wherein the ester of an alkoxyaliphatic acid is butyl 3-ethoxypropionate.

5. A binder composition according to claim 2 wherein the ester of an alkoxyaliphatic acid is butyl 3-butoxypropionate.

6. A binder composition according to claim 1 wherein the phenolic resin component comprises a resin having benzylic ether bridges between the phenolic rings.

7. A binder composition according to claim 1 wherein the phenolic resin component is an alkoxy modified phenolic resole resin.

8. A binder composition according to claim 7 wherein the alkoxy modified phenolic resole resin is a methoxy modified phenolic resole resin.

9. A binder composition according to claim 1 wherein the isocyanate component is polymethylene polyphenylisocyanate.

10. A binder composition according to claim 1 wherein the solvent further comprises a hydrocarbon solvent.

11. A binder composition according to claim 1 wherein the solvent comprises other polar solvents in combination with the liquid ester of an alkoxyaliphatic carboxylic acid.

12. A foundry mix containing sand as the major constituent and a binding amount of up to 6% based on the weight of the sand of the binder composition of claim 1.

13. In a process for making foundry cores and molds employing a polyurethane binder wherein the improvement comprises using a solvent for the binder components which comprises a liquid ester of an alkoxyaliphatic carboxylic acid.

14. The process of claim 13 wherein the liquid ester of an alkoxyaliphatic acid has the general formula:

$$RO(CH_2)_n CHR^2 CO_2 R^1$$

wherein R and $R^1$ are alkyl groups having 1 to 8 carbon atoms, $R^2$ is hydrogen or an alkyl group having from 1 to 4 carbon atoms, n is zero or a small positive integer, and the phenolic resin forms a homogenous solution at room temperature with the solvent.

15. The process of claim 14 wherein the liquid ester of an alkoxyaliphatic acid is ethyl 3-ethoxypropionate.

16. The process of claim 14 wherein the liquid ester of an alkoxyaliphatic acid is butyl 3-ethoxypropionate.

17. The process of claim 14 wherein the liquid ester of an alkoxyaliphatic acid is butyl 3-butoxypropionate.

18. The process of claim 13 wherein the phenolic resin component comprises a resin having benzylic ether bridges between the phenolic rings.

19. The process of claim 13 wherein the phenolic resin component is an alkoxy modified phenolic resole resin.

20. The process of claim 19 wherein the alkoxy modified phenolic resole resin is a methoxy modified phenolic resole resin.

21. The process of claim 13 wherein the isocyanate component is polymethylene polyphenylisocyanate.

22. The process of claim 13 wherein the solvent further comprises a hydrocarbon solvent.

23. The process of claim 13 wherein the solvent comprises other polar solvents in combination with the liquid ester of an alkoxyaliphatic carboxylic acid.

24. The process of claim 13 wherein the process is a "no-bake" foundry process.

25. The process of claim 13 wherein the process is a "cold-box" foundry process.

* * * * *

UNITED STATES PATENT AND TRADEMARK OFFICE
CERTIFICATE OF CORRECTION

PATENT NO. : 4,698,377
DATED : October 6, 1987
INVENTOR(S) : Robert A. Laitar

It is certified that error appears in the above–identified patent and that said Letters Patent are hereby corrected as shown below:

Column 3, line 38, "8%" should read --80%--.

Signed and Sealed this

Twenty-third Day of August, 1988

*Attest:*

DONALD J. QUIGG

*Attesting Officer*     *Commissioner of Patents and Trademarks*